United States Patent
Nakatani et al.

(10) Patent No.: US 9,868,877 B2
(45) Date of Patent: Jan. 16, 2018

(54) COMPOSITION AND METHOD FOR PRODUCING THE SAME, AND POWDER COATING MATERIAL, PELLET, RESIN FORMED ARTICLE, AND ELECTRIC WIRE

(75) Inventors: Yasukazu Nakatani, Settsu (JP); Toshio Miyatani, Settsu (JP); Hiroshi Torii, Settsu (JP); Natsumi Okamoto, Settsu (JP); Takayuki Hirao, Settsu (JP); Manabu Fujisawa, Settsu (JP); Shigehito Sagisaka, Settsu (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 662 days.

(21) Appl. No.: 13/381,516

(22) PCT Filed: Jun. 17, 2010

(86) PCT No.: PCT/JP2010/060300
§ 371 (c)(1),
(2), (4) Date: Dec. 29, 2011

(87) PCT Pub. No.: WO2011/001833
PCT Pub. Date: Jan. 6, 2011

(65) Prior Publication Data
US 2012/0111601 A1    May 10, 2012

(30) Foreign Application Priority Data

Jun. 30, 2009  (JP) ................................ 2009-156023
Mar. 31, 2010  (JP) ................................ 2010-084072

(51) Int. Cl.
| | | |
|---|---|---|
| *B32B 19/00* | (2006.01) |
| *H01B 3/30* | (2006.01) |
| *C08K 5/07* | (2006.01) |
| *C09D 127/12* | (2006.01) |
| *C08K 5/00* | (2006.01) |
| *C09D 127/16* | (2006.01) |
| *C09D 127/18* | (2006.01) |

(52) U.S. Cl.
CPC .......... *C09D 127/12* (2013.01); *C08K 5/0091* (2013.01); *C09D 127/16* (2013.01); *C09D 127/18* (2013.01)

(58) Field of Classification Search
CPC .......... H01B 3/30; C08K 5/07; C08K 5/3415; C08K 5/098; C08K 5/3417
USPC .......................................... 428/357; 524/130
See application file for complete search history.

(56) References Cited

U.S. PATENT DOCUMENTS

| | | | |
|---|---|---|---|
| 4,098,756 A | 7/1978 | Miller et al. | |
| 4,110,308 A | 8/1978 | Abe et al. | |
| 4,276,214 A * | 6/1981 | Yoshimura et al. | 524/546 |
| 4,853,425 A | 8/1989 | Yoshimura et al. | |
| 5,229,465 A | 7/1993 | Tsuchida et al. | |
| 6,335,112 B1 | 1/2002 | Asukabe et al. | |
| 2005/0109530 A1* | 5/2005 | Maeda | 174/128.1 |
| 2009/0163628 A1* | 6/2009 | Sturgill et al. | 524/130 |

FOREIGN PATENT DOCUMENTS

| | | |
|---|---|---|
| CN | 1059737 A | 3/1992 |
| EP | 0084771 A2 | 8/1983 |
| EP | 1188808 A1 | 3/2002 |
| JP | 52-25850 | 2/1977 |
| JP | 52-126431 A | 10/1977 |
| JP | 52-126431 A | 10/1977 |
| JP | 55-133442 A | 10/1980 |
| JP | 58-141252 A | 8/1983 |
| JP | 61-25750 B2 | 6/1986 |
| JP | 63-89557 A | 4/1988 |
| JP | 63-89557 A | 4/1988 |
| JP | 63-128054 A | 5/1988 |
| JP | 05-239298 A | 9/1993 |
| JP | 05-239298 A | 9/1993 |
| JP | 08-143883 A | 6/1996 |
| JP | 10-095889 A | 4/1998 |
| JP | 10-095889 A | 4/1998 |
| JP | 2000-103812 A | 4/2000 |
| JP | 2000-106203 A | 4/2000 |
| JP | 3135354 B2 | 2/2001 |
| JP | 2003-003111 A | 1/2003 |
| JP | 2005-272573 A | 10/2005 |
| JP | 2005-272573 A | 10/2005 |
| JP | 2006-206637 A | 8/2006 |
| JP | 2007-204666 A | 8/2007 |

OTHER PUBLICATIONS

International Search Report of PCT/JP2010/060300, dated Aug. 24, 2010.

* cited by examiner

*Primary Examiner* — Jennifer Chriss
*Assistant Examiner* — Ricardo Lopez
(74) *Attorney, Agent, or Firm* — Sughrue Mion, PLLC

(57) ABSTRACT

The present invention provides a composition including a fluorine-containing polymer, and excellent in heat resistance even if only a small amount of additives is added to the composition. The present invention relates to a composition, comprising: a fluorine-containing polymer (a) and a cobalt compound (b).

14 Claims, No Drawings

US 9,868,877 B2

COMPOSITION AND METHOD FOR PRODUCING THE SAME, AND POWDER COATING MATERIAL, PELLET, RESIN FORMED ARTICLE, AND ELECTRIC WIRE

CROSS REFERENCE TO RELATED APPLICATIONS

This application is a National Stage of International Application No. PCT/JP2010/060300 filed Jun. 17, 2010, claiming priority based on Japanese Patent Application No. 2009-156023 filed Jun. 30, 2009, and Japanese Patent Application No. 2010-084072 filed Mar. 31, 2010, the contents of all of which are incorporated herein by reference in their entirety.

TECHNICAL FIELD

The present invention relates to a composition and a method for producing the same, and a powder coating material, a pellet, a resin formed article, and an electric wire.

BACKGROUND ART

Compositions comprising a fluorine-containing polymer have excellent characteristics, such as heat resistance, chemical resistance, solvent resistance, and insulation. Therefore, such compositions are used in various products requiring heat resistance. Specifically, the compositions are used in coating materials and various formed articles such as electronic equipment, vehicles and electric wires. The coating films and formed articles and the like made from the coating materials may be exposed to high temperatures during use, as well as during production. Therefore, starting compositions are needed to be prevented from coloring at high temperatures and needed to be further improved in thermal stability, heat aging resistance, and the like.

For example, coating materials including a fluorine-containing polymer generally need to be melted by heating for being formed into a film after being applied to an object. In order to form a corrosion resistant lining, the steps of applying and melting by heating are repeated several times because the lining needs to have a certain degree of thickness. The fluorine-containing polymer has heat resistance. However, the fluorine-containing polymer heated at a temperature in the vicinity of the melting point or higher for a long time may be thermally degraded, and colored, and may become brittle or be bubbled. Therefore, it is known that thermostabilizers are used in coatings.

Patent Document 1 discloses a fluororesin powder for rotational forming containing copper or a copper compound, as a technique in which a metallic compound is used as a thermostabilizer. Patent Document 2 discloses a powder composition including ethylene/tetrafluoroethylene copolymer and a thermostabilizer. The thermostabilizer is at least one selected from the group consisting of copper compounds, tin compounds, iron compounds, lead compounds, titanium compounds, and aluminum compounds. Patent Document 3 discloses a fluororesin composition containing, as a stabilizer, at least one of a carbon black powder, an organic sulfur compound, an amine antioxidant, fine powders of zinc, tin, cobalt, nickel, or iron.

Patent Document 4 discloses a powder coating material including a copolymer comprising ethylene and tetrafluoroethylene, and a stabilizer containing no metallic element, as a technique in which a metallic compound is not used as a stabilizer. Further, Patent Documents 5, 6, and 7, for example, disclose, as a composition for coating, a composition including a metallic element for improving adhesion between a coating film and a substrate, but not for being used as a stabilizer.

Patent Document 8, for example, discloses, as a fluororesin including a metallic element, a formed product comprising a copper-containing fluororesin in which a carboxyl group of a fluoroolefin polymer having —$CF_2COOH$ is converted into a copper salt. Such copper is included for intercepting a near infrared ray, but not for being used as a stabilizer.

As a technique for adding an additive to a composition to be made into a formed article, Patent Document 9 discloses an ethylene-4 fluoroethylene copolymer composition improved in thermal stability. The composition is prepared by adding copper or a copper compound to ethylene-4 fluoroethylene copolymer and mixing them.

Patent Document 10 discloses a high-temperature grease composition containing at least one or more of (i) fluoro silicone oil, (ii) fluororesin thickeners, (iii) additives such as a modified undecane mixture, a modified butane, Cu phthalocyanine, and Ca sulfonate, as fluorine grease which is prevented from degradation under high temperature conditions and excellent in heat resistance having long-term stability. However, Patent Document 10 does not disclose a cobalt compound at all.

Patent Document 11 discloses a heat-resistant-resin product including a resin layer in which granular materials are dispersed. The product provides carbon dioxide reduction effects by including a metalloporphyrin complex in liposome as the granular materials.

Patent Document 1: JP 3135354 B
Patent Document 2: JP 2006-206637 A
Patent Document 3: JP 55-133442 A
Patent Document 4: JP 2003-3111 A
Patent Document 5: JP 52-126431 A
Patent Document 6: JP 61-25750 B
Patent Document 7: JP 58-141252 A
Patent Document 8: JP 2000-103812 A
Patent Document 9: JP 52-25850 A
Patent Document 10: JP 8-143883 A
Patent Document 11: JP 2007-204666 A

SUMMARY OF THE INVENTION

Problems to be Solved by the Invention

However, sufficient heat resistance is not imparted to compositions by addition of only a small amount of metal oxides which are conventionally used as stabilizers. For example, when a large amount of metal oxides is added, coloring due to metals may generate. Further, even if compositions are used in the fields where coloring does not matter, too large an amount of stabilizers may impair excellent characteristics of fluorine-containing polymers.

The present invention provides a composition including a fluorine-containing polymer, and excellent in heat resistance even if only a small amount of additives is added to the composition.

Means for Solving the Problems

The present invention is a composition, comprising: a fluorine-containing polymer (a) and a cobalt compound (b).

The cobalt compound (b) is preferably at least one selected from the group consisting of cobalt acetate, cobalt benzoate, and organometallic complexes of cobalt.

The cobalt compound (b) is preferably a tetrapyrrole cyclic compound.

The cobalt compound (b) is preferably an organometallic complex in which a ligand having a porphyrin ring or a phthalocyanine ring makes coordinate bonds with a cobalt atom.

The cobalt compound (b) is preferably phthalocyanine cobalt.

The cobalt compound (b) is preferably cobalt acetylacetonate.

The amount of the cobalt compound (b) is preferably 1 to 100 ppm of the fluorine-containing polymer (a).

The amount of the cobalt compound (b) is preferably 1 to 50 ppm of the fluorine-containing polymer (a).

The fluorine-containing polymer (a) preferably includes a polymerization unit based on at least one monomer selected from the group consisting of tetrafluoroethylene, hexafluoropropylene, perfluoro(alkyl vinyl ether), chlorotrifluoroethylene, vinylidene fluoride, and vinyl fluoride.

The fluorine-containing polymer (a) is preferably at least one selected from the group consisting of polytetrafluoroethylene, tetrafluoroethylene/hexafluoropropylene copolymer, tetrafluoroethylene/perfluoro(alkyl vinyl ether) copolymers, ethylene/tetrafluoroethylene copolymer, ethylene/tetrafluoroethylene/hexafluoropropylene copolymer, polychlorotrifluoroethylene, chlorotrifluoroethylene/tetrafluoroethylene copolymer, ethylene/chlorotrifluoroethylene copolymer, polyvinylidene fluoride, tetrafluoroethylene/vinylidene fluoride copolymer, vinylidene fluoride/hexafluoropropylene/tetrafluoroethylene copolymer, vinylidene fluoride/hexafluoropropylene copolymer, and polyvinyl fluoride.

The fluorine-containing polymer (a) is preferably at least one selected from the group consisting of ethylene/tetrafluoroethylene copolymer and ethylene/tetrafluoroethylene/hexafluoropropylene copolymer.

The composition of the present invention preferably further comprises titanium oxide.

The present invention is also a powder coating material, comprising the composition.

The present invention is also a pellet, comprising the composition.

The present invention is also a resin formed article formed from the composition.

The present invention is also an electric wire, comprising:
a core wire; and
a covering material made of the composition covering the core wire.

The present invention is also a method for producing the composition, the method comprising:
preparing a masterbatch for resin forming including the fluorine-containing polymer (a), and the cobalt compound (b) in an amount of 0.1% by mass or more of the amount of the fluorine-containing polymer (a) by mixing the fluorine-containing polymer (a) and the cobalt compound (b),
preparing the composition by adding the fluorine-containing polymer (a) to the masterbatch for resin forming.

The present invention is described in detail below.

The composition of the present invention includes a fluorine-containing polymer (a) and a cobalt compound (b). The composition of the present invention has the above-mentioned configuration, and therefore addition of only a small amount of the cobalt compound (b) imparts excellent heat resistance to the composition. For example, coloring during heating can be suppressed or thermal stability and heat aging resistance can be improved.

Examples of the cobalt compound (b) include cobalt chloride, cobalt oxide, cobalt carbonate, cobalt sulfate, cobalt nitrate, cobalt phosphate, sulfamic acid cobalt, cobalt bromide, perchloric acid cobalt, cobalt acetate, cobalt benzoate, and organometallic complexes of cobalt.

The cobalt compound (b) may include other metal elements as long as the compound includes cobalt, but does not include an elemental cobalt metal such as a cobalt metal powder. When an elemental cobalt metal is included, only a small amount thereof imparts no effect of prevention of coloring and no effect of improvement in heat aging resistance. In the present invention, the composition can be sufficiently prevented from coloring or improved in thermal stability and heat aging resistance by addition of only a small amount of the cobalt compound (b).

The cobalt compound (b) is preferably at least one cobalt compound selected from the group consisting of cobalt acetate, cobalt benzoate, and organometallic complexes of cobalt, and more preferably organometallic complexes of cobalt. Examples of the organometallic complexes of cobalt include: tetrapyrrole cyclic compounds having a cobalt atom, such as phthalocyanine cobalt and porphyrin cobalt; compounds of hexamminecobalt salts; cobalt acetylacetonate; and compounds of hexamminecobalt salts. When the composition of the present invention comprises organometallic complexes having a cobalt atom, the addition of a small amount of the cobalt compound (b) improves the heat resistance of a composition, a coating film made of the composition, and a formed article. The at least one cobalt compound selected from the group consisting of cobalt acetate, cobalt benzoate, and organometallic complexes of cobalt is particularly preferably used for a powder coating material for suppressing coloring.

The cobalt compound (b) is preferably at least one cobalt compound selected from the group consisting of cobalt acetate, cobalt benzoate, tetrapyrrole cyclic compounds having a cobalt atom, and cobalt acetylacetonate. The cobalt compound (b) is more preferably at least one cobalt compound selected from the group consisting of tetrapyrrole cyclic compounds having a cobalt atom and cobalt acetylacetonate.

The cobalt compound (b) is preferably a tetrapyrrole cyclic compound having a cobalt atom. The composition of the present invention includes the tetrapyrrole cyclic compound having a cobalt atom and the fluorine-containing polymer (a), and therefore the composition has excellent heat resistance (prevention of coloring, thermal stability, and heat aging resistance). For example, in the case where the composition of the present invention is heated, addition of only a small amount of the tetrapyrrole cyclic compound imparts excellent heat resistance to the composition, and therefore a large amount of additives does not need to be added. Therefore, coloring due to a metal element can be suppressed. Further, the formed article made of the composition of the present invention is excellent in thermal stability and heat aging resistance, which prevents degradation of mechanical strength.

As used herein, the tetrapyrrole cyclic compound is a compound having a structure in which four pyrrole rings are bonded to each other in a circular shape. Examples of the tetrapyrrole cyclic compound include compounds having a structure in which four pyrrole rings and a carbon atom or a nitrogen atom are bonded to each other to form a circular shape, the carbon atom or the nitrogen atom being placed between the pyrrole rings. More specifically, the compounds preferably have a porphyrin ring, a phthalocyanine ring, and the like. The tetrapyrrole cyclic compound may not be an organometallic complex as long as it has a cobalt atom.

The tetrapyrrole cyclic compound is preferably an organometallic complex in which a ligand makes coordinate bonds with a cobalt atom, in view of stability and durability of effects. The composition of the present invention includes the organometallic complex having a ligand having a specific structure and a cobalt atom, which leads to improvement in heat resistance of a formed article made of the composition and leads to prevention of thermal degradation. Further, coloring caused by heating can be suppressed. As used herein, "ligand" means an atomic group including an atom which makes coordinate bonds with the cobalt atom.

The tetrapyrrole cyclic compound preferably includes a porphyrin ring or a phthalocyanine ring, and more preferably includes a porphyrin ring, in view of improvement in thermal stability and heat aging resistance. The porphyrin ring is an organic framework comprising carbon atoms and nitrogen atoms, represented by the following formula.

[Formula 1]

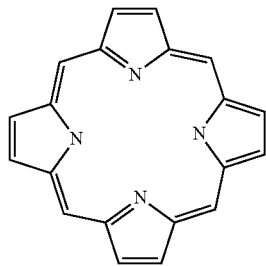

The tetrapyrrole cyclic compound may be a compound including a substituent bonded to a porphyrin ring.

The phthalocyanine ring is an organic framework comprising carbon atoms and nitrogen atoms, represented by the following formula.

[Formula 2]

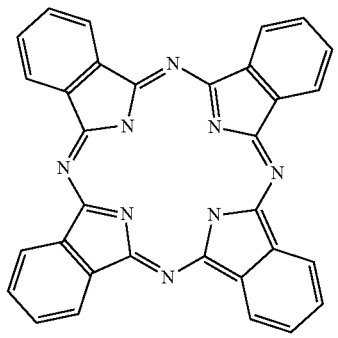

The tetrapyrrole cyclic compound may be a compound including a substituent bonded to a phthalocyanine ring.

The tetrapyrrole cyclic compound is preferably an organometallic complex in which a ligand having a porphyrin ring or a phthalocyanine ring makes coordinate bonds with a cobalt atom, and more preferably an organometallic complex in which a ligand having a porphyrin ring makes coordinate bonds with a cobalt atom in view of improvement in thermal stability and heat aging resistance. The organometallic complex in which a ligand having a porphyrin ring makes coordinate bonds with a cobalt atom is particularly preferably used in a formed article such as a covering material of an electric wire.

The heat resistance of the composition can be improved by addition of only a small amount of an organometallic complex having a ligand in a specific structure a cobalt atom.

The organometallic complex in which the ligand having a porphyrin ring makes coordinate bonds with a metal atom is preferably, for example, compounds represented by the following formula (1), wherein $R^1$s are the same or different, and each represent a hydrogen atom or a C1-C10 hydrocarbon group which may have an oxygen atom.

[Formula 3]

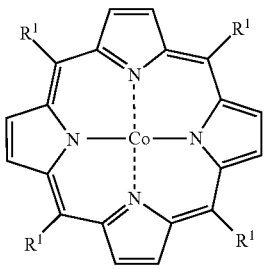

(1)

$R^1$ may have an arylene group such as a phenylene group, or may have an alkoxy group or a hydroxyl group. $R^1$s may be the same or different, and are preferably, for example, a hydrogen atom, a phenyl group, an alkyl phenyl group having a C1-C4 alkyl group, an alkoxy phenyl group having a C1-C4 alkoxy group, or a C1-C10 alkyl group.

It is one of the preferred embodiments that the organometallic complex in which a ligand having a porphyrin ring makes coordinate bonds with a cobalt atom is preferably, for example, compounds represented by the following formula (2), wherein $R^2$s are the same or different, and each represent a hydrogen atom or a C1-C4 alkyl group.

[Formula 4]

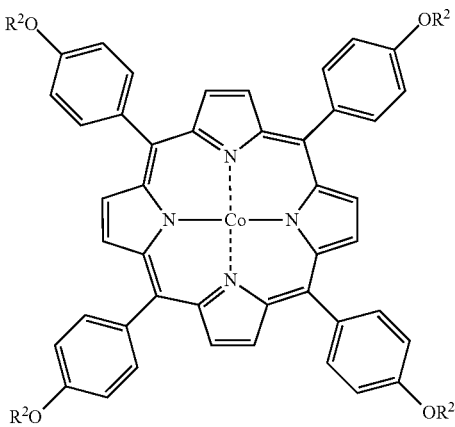

(2)

$R^2$ is more preferably a methyl group.

The organometallic complex more preferably has a structure in which a ligand having a phthalocyanine ring makes coordinate bonds with a cobalt atom for suppression of coloring after heating. The organometallic complex in which a ligand having a phthalocyanine ring makes coordinate bonds with a cobalt atom is preferably, for example, compounds represented by the following formula (3), wherein $R^3$s are the same or different, and each represent a hydrogen atom or a C1-C10 hydrocarbon group which may have an oxygen atom.

[Formula 5]

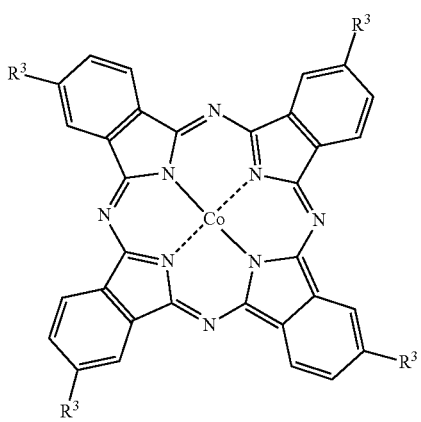

(3)

$R^3$ may have an arylene group such as a phenylene group, or may have an alkoxy group or a hydroxyl group. $R^3$s may be the same or different, and are each preferably, for example, a hydrogen atom, a phenyl group, an alkyl phenyl group having a C1-C4 alkyl group, an alkoxy phenyl group having a C1-C4 alkoxy group, or a C1-C10 alkyl group. $R^3$ is more preferably a hydrogen atom.

The tetrapyrrole cyclic compound is preferably the compounds represented by the formula (1) or the compounds represented by the formula (3), and more preferably the compounds represented by the formula (2) or the compounds represented by the formula (3). The compounds represented by the formula (2) are still more preferable in view of improvement in thermal stability and heat aging resistance. The compounds represented by the formula (3) are still more preferable for suppression of coloring after heating.

Preferable examples of the tetrapyrrole cyclic compound include phthalocyanine cobalt and porphyrin cobalt. For improving thermal stability and heat aging resistance, the cobalt compound (b) is more preferably porphyrin cobalt, and the porphyrin cobalt is particularly preferably used for a covering material of an electric wire. Examples of the porphyrin cobalt include meso-tetramethoxy phenylporphyrin cobalt. The cobalt compound (b) is more preferably phthalocyanine cobalt for suppression of coloring. When the composition of the present invention is used as a powder coating material, the cobalt compound (b) is particularly preferably phthalocyanine cobalt.

When the composition contains the cobalt compound (b), the cobalt compound (b) may be contained in an outer shell material such as liposome. In such a case, sufficient interaction does not generate between the cobalt compound (b) and oxygen radicals causing heat degradation or radicals on a main chain generated by an attack of oxygen radicals. As a result, acceptance and donation of electrons are not carried out. Therefore, it is considered that the effects of improvement in heat-resistant cannot be imparted. That is, it is one of the preferred embodiments that the composition of the present invention includes the fluorine-containing polymer (a) and the cobalt compound (b), excepting the embodiment where the cobalt compound (b) is contained in an outer shell material such as liposome.

It is one of the preferred embodiments that the cobalt compound (b) is cobalt acetylacetonate. The composition of the present invention including the fluorine-containing polymer (a) and cobalt acetylacetonate is excellent in heat resistance. For example, when the composition is heated, only a small amount of the cobalt acetylacetonate imparts to the composition excellent heat resistance, particularly, excellent thermal stability and heat aging resistance. As a result, a large amount of additives does not need to be added for prevention of degradation of the mechanical strength of the formed article formed from the composition. Further, the addition of only a small amount of the cobalt acetylacetonate imparts excellent heat resistance to the composition, and therefore coloring due to a metal atom can be suppressed.

The cobalt acetylacetonate may be a hydrate. For example, cobalt acetylacetonate dihydrate may be used as the cobalt acetylacetonate.

The formed article formed from the composition of the present invention containing cobalt acetylacetonate is improved in heat resistance and prevented from thermal degradation.

The amount of the cobalt compound (b) is preferably 1 to 100 ppm by weight of the fluorine-containing polymer (a). The amount of the cobalt compound (b) is more preferably 80 ppm by weight or less, and still more preferably 50 ppm by weight or less. In other words, the cobalt compound (b) is preferably 0.0001 to 0.0100 parts by mass, more preferably 0.0080 parts by mass or less, and still more preferably 0.0050 parts by mass or less, relative to 100 parts by mass of the fluorine-containing polymer (a). The amount of the cobalt compound (b) is more preferably 5 ppm or more (0.0005 parts by mass or more relative to 100 parts by mass of the fluorine-containing polymer (a)) of the fluorine-containing polymer (a).

According to the composition of the present invention, the composition, and the coating film and formed article formed from the composition can be improved in heat resistance even if the amount of the cobalt compound (b) is as low as 100 ppm or less.

When the composition of the present invention is used in a formed article such as a covering material of an electric wire, the amount of the cobalt compound (b) is preferably 25 ppm or more (0.0025 parts by mass or more relative to 100 parts by mass of the fluorine-containing polymer (a)).

When the composition is used for a powder coating material, the amount of the cobalt compound (b) is more preferably less than 50 ppm of the fluorine-containing polymer (a), still more preferably 30 ppm or less of the fluorine-containing polymer (a), and particularly preferably less than 25 ppm of the fluorine-containing polymer (a) for suppression of coloring caused by heating. In other words, the cobalt compound (b) is more preferably less than 0.0050 parts by mass, still more preferably 0.0030 parts by mass or less, and particularly preferably less than 0.0025 parts by mass, relative to 100 parts by mass of the fluorine-containing polymer (a). Even if the amount is as low as 10 ppm or less (0.0010 parts by mass or less relative to 100 parts by mass of the fluorine-containing polymer (a)), coloring can be suppressed. When the composition is used for a powder coating material, the lower limit of the amount of the cobalt compound (b) is not particularly limited, and the amount is preferably 1 ppm (0.0001 parts by mass relative to 100 parts by mass of the fluorine-containing polymer (a)), and more preferably 5 ppm (0.0005 parts by mass relative to 100 parts by mass of the fluorine-containing polymer (a)).

The cobalt compound (b) can be produced by a conventionally known method. A commercially available cobalt compound may be used.

The composition of the present invention includes the fluorine-containing polymer (a). Therefore, the composition is excellent in suppression of coloring during heating and mechanical strength and the like. The fluorine-containing polymer (a) may be prepared by polymerization of only a fluorine-containing monomer, or may be prepared by polymerization of a fluorine-containing monomer and a fluorine-free monomer which has no fluorine atom. The fluorine-containing polymer (a) may be a resin or an elastomer. For example, when the composition of the present invention is used as a powder coating material or an electric wire covering material, the fluorine-containing polymer (a) is preferably a resin.

The fluorine-containing polymer (a) preferably includes a polymerization unit based on at least one fluorine-containing monomer selected from the group consisting of tetrafluoroethylene [TFE]; vinylidene fluoride [VdF]; chlorotrifluoroethylene [CTFE]; vinyl fluoride [VF]; hexafluoropropylene [HFP]; hexafluoroisobutene [HFIB]; monomers represented by $CH_2=CX^1(CF_2)_nX^2$ (in the formula, $X^1$ is H or F, $X^2$ is H, F or Cl, and n is an integer of 1 to 10); perfluoro(alkyl vinyl ether) [PAVE] represented by $CF_2=CF-ORf^1$ (in the formula, $Rf^1$ represents a C1-C8 perfluoroalkyl group); and alkyl perfluorovinyl ether derivatives represented by $CF_2=CF-OCH_2-Rf^2$ (in the formula, $Rf^2$ is a C1-C5 perfluoroalkyl group); trifluoro ethylene; trifluoropropylene; tetrafluoropropylene; pentafluoropropylene; trifluorobutane; tetrafluoroisobutene; and iodine-containing fluorination vinyl ether. The fluorine-containing polymer (a) may include, as a fluorine-free monomer, a polymerization unit based on at least one monomer selected from the group consisting of ethylene [Et], propylene [Pr], and alkyl vinyl ethers.

The fluorine-containing polymer (a) is preferably a copolymer including a polymerization unit based on at least one monomer selected from the group consisting of TFE, HFP, PAVE, CTFE, VdF, and VF. The fluorine-containing polymer (a) is preferably a copolymer having a polymerization unit based on Et as a fluorine-free monomer.

As used herein, the "polymerization unit" means part of a molecular structure of the fluorine-containing polymer (a), and means a portion based on a corresponding monomer.

When the fluorine-containing polymer (a) is a resin, it is preferably at least one selected from the group consisting of polytetrafluoroethylene [PTFE], TFE/HFP copolymer [FEP], TFE/PAVE copolymer [PFA], Et/TFE copolymer, Et/TFE/HFP copolymer, polychlorotrifluoroethylene [PCTFE], CTFE/TFE copolymer, Et/CTFE copolymer, polyvinylidene fluoride [PVdF], TFE/VdF copolymer, VdF/HFP/TFE copolymer, VdF/HFP copolymer, and polyvinyl fluoride [PVF].

As used herein, the "TFE/HFP copolymer" means a copolymer containing a polymerization unit based on TFE (TFE unit) and a polymerization unit based on HFP (HFP unit). The same is true of other copolymers.

PTFE may be a TFE homopolymer, or may be modified PTFE. As used herein, the "modified PTFE" means one prepared by copolymerization of TFE and a comonomer (modifier) in a small amount such that no melt processability is provided to a copolymer to be obtained.

The modifier in the modified PTFE is not particularly limited as long as the modifier is copolymerizable with TFE. Examples of the modifier include: perfluoroolefins such as HFP; chlorofluoroolefins such as CTFE; hydrogen-containing fluoroolefins such as trifluoroethylene and VdF; perfluorovinyl ether; perfluoro alkyl ethylenes such as perfluorobutyl ethylene; and ethylene. The modifier to be used may comprise one or two or more species.

Perfluoro vinyl ether used as the modifier is not particularly limited. Examples of the perfluorovinyl ether include perfluoro unsaturated compounds represented by the following general formula (I):

$$CF_2=CF-ORf \qquad (I)$$

wherein, Rf represents a perfluoro organic group). As used herein, the "perfluoro organic group" means an organic group in which fluorine atoms are substituted for all hydrogen atoms each bonded to a carbon atom. The perfluoro organic group may have ether oxygen.

The perfluorovinyl ether used as the modifier is preferably, for example, perfluoro(alkyl vinyl ether) [PAVE] in which Rf in the formula (I) represents a C1-C10 perfluoroalkyl group. The perfluoroalkyl group preferably contains 1 to 5 carbon atoms.

The ratio (% by mass) of the modifier in the modified PTFE is generally preferably 1% by mass or less, and more preferably 0.001 to 1% by mass, of the total amount of the modifier and TFE, and also preferably 0.001% by mass or more and less than 1% by mass.

The ratio of the HFP unit is over 2% by mass, preferably 20% by mass or less, and more preferably 10 to 15% by mass, in the FEP.

PAVE in the PFA preferably includes a C1-C6 alkyl group. More preferably, examples of the PAVE include PMVE, PEVE, and PPVE. The ratio of the PAVE unit in the PFA is over 2% by mass, preferably 5% by mass or less, and more preferably 2.5 to 4.0% by mass.

The FEP and PFA may be each polymerized with other monomers as long as the FEP and PFA each have the composition mentioned above. For example, the FEP may be polymerized with PAVE as the other monomers, and the PFA may be polymerized with HFP as the other monomers. One or two or more of the other monomers may be used.

The ratio of the other monomers to be polymerized with the FEP and PFA depends on the kind thereof, and is generally preferably 1% by mass or less of the fluorine-containing polymer (A). The upper limit of the ration of the other monomers is more preferably 0.5% by mass, and still more preferably 0.3% by mass.

The Et/TFE copolymer preferably has a molar ratio of Et unit:TFE unit of 20:80 to 80:20. If the Et unit:TFE unit molar ratio is less than 20:80, the productivity may be lowered. If the Et unit:TFE unit molar ratio is over 80:20, the corrosion resistance may be reduced. The Et unit:TFE unit molar ratio is more preferably 35:65 to 55:45. The Et/TFE copolymer includes a polymerization unit based on TFE and a polymerization unit based on Et, and may include a polymerization unit based on the other fluorine-containing monomers.

It is one of the preferred embodiments that the Et/TFE copolymer includes, in addition to the Et unit and the TFE unit, as a monomer component, a monomer unit based on at least one monomer selected from the group consisting of other fluorine-containing monomers and fluorine-free monomers. The other fluorine-containing monomers are not particularly limited as long as they are addable to both ethylene and TFE. A fluorine-containing vinyl monomer containing 3 to 10 carbon atoms is easily used as the other fluorine-containing monomers. Examples of the other fluorine-containing monomers include hexafluoro isobutylene, $CH_2=CFC_3F_6H$, and HFP. Particularly, preferred is a fluorine-containing monomer represented by the following general formula:

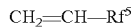

wherein $Rf^5$ represents a C4-C8 perfluoroalkyl group. The fluorine-free monomer may be a vinyl monomer represented by the following general formula:

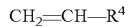

wherein $R^4$ may have any number of carbon atoms and may include an aromatic ring, a carbonyl group, an ester group, an ether group, an amide group, a cyano group, a hydroxyl group, and an epoxy group, and $R^4$ does not include fluorine.

It is one of the preferred embodiments that Et/TFE copolymer is Et/TFE/HFP copolymer (EFEP), and may include a monomer unit based on the other fluorine-containing monomers (other than HFP) or fluorine-free monomers. The percentage of the monomer other than ethylene and TFE is preferably 10 mol % or less, and more preferably 5 mol % or less, of the total monomer components of the copolymer comprising ethylene and TFE. The molar ratio of Et unit:TFE unit:monomer unit based on other fluorine-containing monomers or fluorine-free monomers is preferably 31.5 to 54.7:40.5 to 64.7:0.5 to 10.

The PCTFE is a polymer in which a polymerization unit is substantially consists of a CTFE unit.

The CTFE/TFE copolymer preferably has a molar ratio of the CTFE unit to TFE unit of CTFE:TFE=2:98 to 98:2, more preferably 5:95 to 90:10, and still more preferably 20:80 to 90:10.

The CTFE/TFE copolymer preferably comprises CTFE, TFE, and a monomer copolymerizable with CTFE and TFE. Examples of the monomer copolymerizable with CTFE and TFE include: ethylene; VdF; HFP; monomers represented by $CH_2=CX^1(CF_2)_nX^2$ (in the formula, $X^1$ is H or F, $X^2$ is H, F or Cl, and n is an integer of 1 to 10); PAVE; and alkyl perfluorovinyl ether derivatives represented by $CF_2=CF-OCH_2-Rf^3$ (in the formula, $Rf^3$ represents a C1-C5 perfluoroalkyl group). Preferred among them are at least one selected from the group consisting of ethylene, VdF, HFP, and PAVE, and more preferred is PAVE. Examples of PAVE include those described above. The molar ratio of a monomer unit of a CTFE unit and a TFE unit to a monomer unit of a monomer copolymerizable with CTFE and TFE is preferably a monomer unit of the total of CTFE unit and TFE unit:monomer unit of monomers copolymerizable with CTFE and TFE=90 to 99.9:10 to 0.1.

The Et/CTFE copolymer preferably has a molar ratio of a CTFE unit to an Et unit of CTFE:Et=30:70 to 70:30, and more preferably 40:60 to 60:40.

The PVdF is a polymer in which a polymerization unit is substantially consisting of a VdF unit.

The VdF/HFP copolymer preferably has a molar ratio of VdF/HFP of 45 to 85/55 to 15, more preferably 50 to 80/50 to 20, and still more preferably 60 to 80/40 to 20. The VdF/HFP copolymer includes a polymerization unit based on VdF, a polymerization unit based on HFP, and a polymerization unit based on other fluorine-containing monomers. For example, it is one of the preferred embodiments that the VdF/HFP copolymer comprises VdF/HFP/TFE copolymer.

The VdF/HFP/TFE copolymer preferably has a molar ratio of VdF/HFP/TFE of 40 to 80/10 to 35/10 to 25. The VdF/HFP/TFE copolymer may be a resin or an elastomer. In the case where the VdF/HFP/TFE copolymer is a composition having the above-mentioned molar ratio, the copolymer is usually a resin.

The PVF is a polymer in which a polymerization unit substantially consisting of a VF unit.

The fluorine-containing polymer (a) preferably includes a methylene group. The polymer is at least one selected from the group consisting of Et/TFE copolymer, TFE/VdF copolymer, and PVdF.

When the composition of the present invention is used as a paint, the fluorine-containing polymer (a) preferably has melt processability, and preferably at least one selected from the group consisting of FEP, PFA, Et/TFE copolymer, and CTFE/TFE copolymer.

The fluorine-containing polymer (a) is preferably at least one selected from the group consisting of Et/TFE copolymer and Et/TFE/HFP copolymer, in view of excellent heat resistance, chemical resistance, weather resistance, and gas barrier properties. The Et/TFE copolymer and the Et/TFE/HFP copolymer heated at a temperature in the vicinity of the melting point for a long time may be thermally degraded, and colored, and may become brittle or be bubbled. Since the composition of the present invention includes the cobalt compound (b), heat resistance is improved. The cobalt compound (b) is preferably a tetrapyrrole cyclic compound, in view of excellent heat resistance, chemical resistance, weather resistance, and gas barrier properties. Such a composition is particularly useful when used as a formed article such as an electric wire covering material.

The amount of each of the monomer units included in the copolymer can be determined by appropriately combining the techniques of NMR, FT-IR, elemental analysis, and X-ray fluorescence analysis in accordance with the kind of the monomers.

When the fluorine-containing polymer (a) is a resin, the polymer (a) preferably has, a melting point of 150 to 270° C., for example, depending upon the use of the composition. When the fluorine-containing polymer (a) has a melting point, the fluorine-containing polymer (a) is a resin. As used herein, the melting point of the fluorine-containing polymer (a) is a value determined as the temperature corresponding to the maximum value on a heat-of-fusion curve as measured using a DSC apparatus (product of Seiko) at a rate of 10° C./min.

The melt flow rate (MFR) of the fluorine-containing polymer (a) is 1 to 60 g/10 min depending upon the use of the composition produced. The MFR is more preferably 40 g/10 min or less. For example, in the case where the composition is used as a powder coating material, when the MFR is as small as less than 1 g/10 min, the coating needs to be heated for a long time for giving smoothness of the resulting coating film, which may cause the degradation of the fluorine-containing polymer (a). On the other hand, when the MFR is too great, the resulting coating film may easily crack by heat distortion, and corrosion resistance may be impaired by stress crack due to chemicals. When frequency of coating of the powder coating material may be reduced in view of the smoothness of the resulting coating film, relatively high MFR within the above value range offers advantage.

In the case where the composition of the present invention is used as a powder coating material, when the powder coating material is applied in a thin film, the frequency of coating such as rotolining is one time or more, and the frequency of coating is less than 3 times, the melt flow rate is preferably 5 to 40 g/10 min. On the other hand, when the powder coating material is applied in a thick film, and the frequency of coating such as electrostatic coating is 3 to 10 times or more, the melt flow rate is preferably 1 to 5 g/10 min.

The fluorine-containing polymer (a) in which the copolymerization composition and the molecular weight are adjusted has a melt flow rate within the above-mentioned range. In the description, in the case where the fluorine-containing polymer (a) is PFA or FEP, the melt flow rate is a value determined in accordance with ASTM D3307-01 at a temperature of 372° C. at a load of 5 kg. In the case where the fluorine-containing polymer (a) is neither PFA nor FEP, the melt flow rate is a value determined in accordance with ASTM D3159 at a temperature of 297° C. at a load of 5 kg.

When the fluorine-containing polymer (a) is a fluoroelastomer, the fluorine-containing polymer (a) is preferably at least one selected from the group consisting of VdF/HFP copolymer, VdF/HFP/TFE copolymer, VdF/CTFE copolymer, VdF/CTFE/TFE copolymer, VdF/PAVE copolymer, VdF/TFE/PAVE copolymer, VdF/HFP/PAVE copolymer, VdF/HFP/TFE/PAVE copolymer, VdF/TFE/Pr copolymer, and VdF/Et/HFP copolymer. In particular, the fluorine-containing polymer (a) is preferably at least one selected from the group consisting of VdF/HFP copolymer, VdF/HFP/TFE copolymer, VdF/PAVE copolymer, VdF/TFE/PAVE copolymer, VdF/HFP/PAVE copolymer, and VdF/HFP/TFE/PAVE copolymer.

When the fluorine-containing polymer (a) is a fluoroelastomer, the PAVE is preferably at least one monomer selected from the group consisting of perfluoro(methyl vinyl ether) and perfluoro(propyl vinyl ether), and particularly preferably perfluoro(methyl vinyl ether).

The number average molecular weight Mn of the fluoroelastomer is preferably 1,000 to 300,000, and more preferably 10,000 to 200,000. If the number average molecular weight is less than 1,000, too low a viscosity tends to deteriorate handling properties. Similarly, if the number average molecular weight exceeds 300,000, too high a viscosity tends to deteriorate handling properties.

The molecular weight distribution (weight average molecular weight Mw/number average molecular weight Mn) of the fluoroelastomer is preferably 1.3 or more, and more preferably 1.5 or more. The upper limit of the molecular weight distribution is not particularly limited, and preferably 8 or less. If the molecular weight distribution is less than 1.3, there are no problems of physical properties, but roll processability tends to deteriorate. If the molecular weight distribution exceeds 8, heat tends to be generated during roll processing or the fluoroelastomer tends to adhere to a roller. The weight average molecular weight Mw and the number average molecular weight Mn are determined by GPC using a solvent such as tetrahydrofuran and n-methylpyrolidone.

The Mooney viscosity of the fluoroelastomer is optimally determined in accordance with a forming method. Therefore, the Mooney viscosity is not particularly limited. For example, when injection forming is performed, the Mooney viscosity at 100° C. is 10 to 120, and preferably 20 to 80. Too high a Mooney viscosity tends to cause forming defects due to low fluidity, and too low a Mooney viscosity tends to cause defects, such as mixing of bubbles. The Mooney viscosity can be measured in accordance with ASTM-D1646 and JIS K6300 under the following conditions.
Measurement instrument: MV2000E, product of ALPHA TECHNOLOGIES Inc.
Rotor rotational speed: 2 rpm
Measurement temperature: 100° C.

The composition of the present invention may include two or more kinds of fluorine-containing polymers. For example, the composition may include Et/TFE copolymer and FEP, may include Et/TFE copolymer and PFA, or may include Et/TFE copolymer, PFA, and FEP, as the fluorine-containing polymer (a).

The amount of each of the monomer units of the copolymer can be calculated by the combination of NMR, FT-IR, elemental analysis, and X-ray fluorescence analysis in accordance with the kind of monomers.

The average particle size of the fluorine-containing polymer (a) may be appropriately set in accordance with the use of the composition of the present invention, and is preferably 10 to 500 µm, for example. In the case where the composition of the present invention is used as a powder coating material, when the average particle size of the fluorine-containing polymer (a) is less than 10 µm, electrostatic repulsion tends to be generated when the composition is applied, and the composition is less likely to be made into a thick film. On the other hand, when the average particle size of the fluorine-containing polymer (a) exceeds 500 µm, the smoothness and the like of the coating film made by rotolining may deteriorate. When the composition is used as the powder coating material, a more preferable range of the average particle size of the fluorine-containing polymer (a) is determined depending on the target film thickness of the coating film prepared by repeatedly coating if necessary and firing. When the coating is applied in a thin film by electrostatic coating, the average particle size of the fluorine-containing polymer (a) is more preferably 20 to 40 µm, and when the coating is applied in a thick film, the average particle size is more preferably 40 to 70 µm. When rotolining is performed, the average particle size is more preferably 150 to 500 µm.

The average particle size of the fluorine-containing polymer (a) can be set within the above-mentioned range by controlling the conditions of grinding and/or classification in the below described method for producing the composition of the present invention. In the present description, the average particle size is a value determined using a laser diffraction particle size distribution measurement apparatus.

The fluorine-containing polymer (a) content of the composition of the present invention is preferably 40% by mass or more, and more preferably 70% by mass or more. Further, the content may be 80% by mass or more, and may be 90% by mass or more. For example, when the composition of the present invention is used for a powder coating material, the fluorine-containing polymer (a) content is preferably 90% by mass or more.

The composition of the present invention may, if necessary, include an additive in addition to the fluorine-containing polymer (a) and the cobalt compound (b).

When the composition of the present invention is used as a powder coating material, examples of the additive include, but not particularly limited to, color pigments such as azo chelate pigments and phthalocyanine pigments; other pigments such as rust preventive pigments and calcined pigments; coating film reinforcing materials such as carbon fiber, glass fiber, glass flakes, and mica; conductivity-imparting materials such as conductive carbons; leveling agents; and antistatic agents.

When the composition of the present invention is used for an electric wire covering, examples of the additive include flame retarders, stabilizers, ultraviolet absorbers, light stabilizers, antistatic agents, nucleating agents, lubricants, fillers, dispersants, metal deactivators, neutralizers, processing aids, mold lubricants, foaming agents, and colorants. Particularly, colorants are generally added in the electric wire covering for identification, and titanium oxides such as titanium dioxide ($TiO_2$) and titanium trioxide ($TiO_3$) can be used as the colorants. That is, the composition of the present invention preferably further includes a titanium oxide.

Titanium dioxide ($TiO_2$) is widely used as a white pigment and as a base pigment for promoting coloring of other colors. Further, titanium dioxide ($TiO_2$) and titanium trioxide ($TiO_3$) are used as a photocatalyst for sterilization and/or soil decomposition. However, problematically, catalysis thereof causes the degradation of a resin under light irradiation or under heating in air. When titanium dioxide is used as a pigment, titanium dioxide is subjected to surface treatment, which partly solves the problems, but the effects of the surface treatment is a little at high temperature. Therefore, titanium dioxide is a major cause of accelerating the resin degradation. When used as a photocatalyst, titanium dioxide and titanium trioxide are not subjected to surface treatment, which does not prevent the resin degradation. However, the composition of the present invention is excellent in heat resistance. Therefore, even if the composition includes a titanium oxide such as titanium dioxide and titanium trioxide, such a composition is excellent in heat resistance. That is, the composition of the present invention is particularly useful for including a titanium oxide.

When a titanium oxide is included in the composition of the present invention, a titanium oxide is preferably 1 to 60% by mass of the total amount of the composition.

A titanium oxide is more preferably 10 to 60% by mass. A titanium oxide is more preferably 1 to 60% by mass of the total amount of the fluorine-containing polymer (a) and the cobalt compound (b), and more preferably 10 to 60% by mass.

The composition of the present invention preferably has a apparent density of 0.4 g/ml or more. In the case where the composition is used as a powder coating material, when the apparent density is less than 0.4 g/ml, bubbles may be formed during coating and/or the frequency of coating may be increased. The apparent density is preferably 0.5 to 1.2 g/ml. When the apparent density exceeds 1.2 g/ml, the composition is not easily commercially produced, which may lead to rising costs. As used herein, the apparent density (g/ml) is a value determined in accordance with JIS K 6891.

A method for producing the composition of the present invention is not particularly limited, and the composition may be produced by a suitable method depending on the use. Examples of the method include known conventional methods such as the method disclosed in JP 63-270740 A in which a fluoro-containing polymer (a) is compressed into a sheet using a roller, the sheet is crushed by grinding equipment and classified to produce powder, the powder is mixed with the cobalt compound (b), and if necessary, an additive such as a colorant and a conductivity-imparting agent in a dry process.

Further, the composition of the present invention may be produced by premixing the fluorine-containing polymer (a), the cobalt compound (b), and if necessary, an additive using a mixer; melt-kneading the mixture using a kneader, a melting extruder, or the like; grinding the mixture obtained by melt-kneading; and if necessary, classifying it. The composition of the present invention is preferably prepared by melt-kneading. The fluorine-containing polymer (a) and the cobalt compound (b) are sufficiently mixed by the melt-kneading, which allows efficient acceptance and donation of electrons between the cobalt compounds (b). Therefore, heat resistance is more improved.

The melt-kneading is preferably performed at a temperature 20 to 60° C. higher than the melting point of the fluorine-containing polymer (a) and lower than the lower temperature of the decomposition temperature of the fluorine-containing polymer (a) and the decomposition temperature of the cobalt compound (b), and more preferably performed at 300° C. or lower.

The present invention is also a method for producing the composition, the method comprising: preparing a masterbatch for resin forming including the fluorine-containing polymer (a), and the cobalt compound (b) in an amount of 0.1% by mass or more of the amount of the fluorine-containing polymer (a) by mixing the fluorine-containing polymer (a) and the cobalt compound (b); and preparing the composition by adding the fluorine-containing polymer (a) to the masterbatch for resin forming.

The method for preparing the masterbatch for resin forming by mixing the fluorine-containing polymer (a) and the cobalt compound (b) is not particularly limited, and a usual method for preparing the masterbatch for resin forming may be used.

The step of preparing the composition may include: premixing the masterbatch for resin forming, the fluorine-containing polymer (a), and if necessary, an additive; melt-kneading the mixture using a kneader, a melting extruder, or the like; grinding the mixture; and if necessary, classifying it. The melt-kneading temperature is the same as that mentioned above.

The masterbatch for resin forming for producing the composition preferably includes the cobalt compound (b) in an amount exceeding 0.1% by mass of the amount of the fluorine-containing polymer (a). The masterbatch for resin forming more preferably includes the cobalt compound (b) in an amount exceeding 0.25% by mass of the amount of the fluorine-containing polymer (a), and still more preferably includes the cobalt compound (b) in an amount exceeding 0.5% by mass of the amount of the fluorine-containing polymer (a). The upper limit of the amount of the cobalt compound (b) included in the masterbatch for resin forming is, for example, 90% by mass of the fluorine-containing polymer (a).

The masterbatch for resin forming may include, if necessary, the additive in addition to the fluorine-containing polymer (a) and the cobalt compound (b). Examples of the additive include flame retarders, stabilizers, ultraviolet absorbers, light stabilizers, antistatic agents, nucleating agents, lubricants, fillers, dispersants, metal deactivators, neutralizers, processing aids, mold lubricants, foaming agents, and colorants.

The present invention is also a masterbatch for resin forming including the fluorine-containing polymer (a) and the cobalt compound (b) in an amount exceeding 0.1% by mass of the fluorine-containing polymer (a). The cobalt compound (b) content of the composition produced by the above-mentioned production method is preferably 1 to 100 ppm. The cobalt compound (b) content is more preferably 80 ppm or less, and still more preferably 50 ppm or less.

In the method for producing the composition, the fluorine-containing polymer (a) included in the masterbatch for resin forming and the fluorine-containing polymer (a) to be added to the masterbatch for resin forming may be the same or different. The amount of the fluorine-containing polymer (a) to be added to the masterbatch for resin forming is twenty times or more as much as the amount of the fluorine-containing polymer (a) included in the masterbatch for resin forming.

The composition of the present invention is prevented from discoloration caused by heating or the like, and is therefore preferably used as compositions for covering such as a powder coating material. It is one of the preferred embodiments that the composition of the present invention is a composition for a paint. That is, the present invention is also a powder coating material comprising the composition. When the composition is used as a powder coating material, the cobalt compound (b) is more preferably at least one selected from the group consisting of cobalt acetate, cobalt benzoate, and organometallic complexes of cobalt, still more preferably tetrapyrrole cyclic compounds, particularly preferably organometallic complexes in which a ligand having a porphyrin ring or a phthalocyanine ring makes coordinate bonds with a cobalt atom, and most preferably phthalocyanine cobalt, in view of advantages of the effects of suppression of coloring.

The powder coating material of the present invention comprises the composition. That is, the powder coating material of the present invention comprises a composition including the fluorine-containing polymer (a) and the cobalt compound (b). The powder coating material of the present invention may include the additive.

Generally, the powder coating material of the present invention is applied to an object to be applied, and burned by heating to be formed into the coating film. The coating film thus formed can be used as a corrosion resistant lining and the like in various uses. The powder coating material may be burned by heating at a temperature appropriately set in accordance with the fluorine-containing polymer (a) used, and for example, is preferably burned by heating at 250 to 350° C. The time for burning the powder coating material by heating, for example, is preferably 20 to 180 minutes. In the case where the application and burning of the powder coating material are performed multiple times, the time for burning the powder coating material by heating refers to one burning time.

The powder coating material of the present invention may be applied, depending on the use, in a thin film having a film thickness of 50 to 200 μm after burning, or may be applied in a thick film having a film thickness of exceeding 200 μm and 10000 μm or less after burning by the coating method such as electrostatic coating and rotolining.

When the steps of applying the powder coating material of the present invention to an object to be applied and burning the powder coating material by heating to form the coating film are defined as one coating step, the film thickness after firing refers to a film thickness obtained by one coating step or a film thickness obtained by repeating the coating step two or more times. As used herein, performing the coating step two or more times may refer to overpainting.

Generally, the powder coating material of the present invention is applied to an object to be applied, and burned by heating to be formed into the coating film. The object to be applied is preferably, but not particularly limited to, a substance requiring corrosion resistance. Examples of the object to be applied include parts to which a corrosion resistant lining is applied, such as tanks, vessels, columns, valves, pumps, joints, and other piping materials; and parts to be subjected to another anti-corrosion processing, such as chemical and medical instruments, wafer baskets, tower packings with coil bobbin shape, valves for medicine, and pump impellers.

The object to be applied may be subjected, if necessary, to surface treatment such as rinsing and sandblasting, and primer coating.

Examples of the method for applying the powder coating material include, but not particularly limited to, an electrostatic coating method, a rotolining method, and a fluidized-bed-coating method. The powder coating material is suitable for an electrostatic coating method and a rotolining method because the stability of the fluorine-containing polymer (a) can be further maintained.

The powder coating material of the present invention may be applied, depending on the use, several times so as to be formed into a film having a desired thickness, and is preferably if necessary applied repeatedly and burned to be formed into a film having a thickness of 50 to 10000 μm.

The powder coating material of the present invention comprises the composition, and therefore the reduction in stability of the fluorine-containing polymer (a) is suppressed under heating, and thus, coloring can be prevented. Further, even if the amount of a metal element contained is small, the stability increases and coloring can be suppressed, which suppresses elution of the metal ion. Therefore, electronic interference is prevented when the powder coating material is used for a corrosion resistant lining of a piping material of a semiconductor manufacturing device, and/or deterioration of chemicals in the instrument is prevented when the powder coating material is used for anti-corrosion of chemical and medical instruments.

Therefore, the powder coating material of the present invention and the coating film obtained by application of the powder coating material are suitable as a corrosion resistant lining of a semiconductor manufacturing device and the like, and suitable for anti-corrosion of chemical and medical instruments. The present invention includes the coating film obtained by application of the powder coating material. The present invention also includes the corrosion resistant lining obtained by application of the powder coating material.

The present invention is also a pellet comprising the composition. The pellet of the present invention can be produced by the method described below. For example, the composition is melted in a cylinder of an extruder; the fluorine-containing polymer (a) melted is extruded through a die attached to the extruder; and a strand of the fluorine-containing polymer (a) extruded is cooled and cut to a desired length; or the melted resin just extruded from the die is cooled with water or air and cut using a cutter arranged along the surface of the die.

The form of the composition fed into the extruder may be, but not particularly limited to, a powder. The fluorine-containing polymer (a) content in the pellet of the present invention is preferably 70% by mass or more, may be 80% by mass or more, and may be 90% by mass or more.

A single screw extruder or a twin screw extruder may be used as the extruder. The temperature for melting the composition is preferably not less than the melting point of the fluorine-containing polymer (a) and not more than the thermal decomposition temperature. A porous die can be used as the die. The porous die is provided with a plurality of pores each providing a pellet with a desired diameter. The pellet of the present invention is excellent in heat resistance, and therefore suitable for materials of a covering material of an electric wire and/or materials for producing a resin formed article.

The composition of the present invention is excellent in heat resistance such as thermal stability and heat aging resistance, and therefore suitable for a composition for a covering material such as an electric wire. That is, it is also one of the preferred embodiments that the composition of the present invention is a composition for an electric wire. The present invention is also a covering material comprising the composition. When the composition is used as a material of a covering material of an electric wire, the cobalt compound (b) is more preferably at least one cobalt compound selected from the group consisting of tetrapyrrole cyclic compounds and cobalt acetylacetonate in view of excellent thermal stability and heat aging resistance. The cobalt compound (b) is still more preferably an organometallic complex in which a ligand having a porphyrin ring or a phthalocyanine ring makes coordinate bonds with a cobalt atom.

The present invention is also an electric wire comprising: a core wire; and a covering material made of the composition and covering the core wire.

The electric wire of the present invention includes the covering material comprising the composition, and therefore is excellent in heat resistance. For example, even if the electric wire is heated, it is excellent in mechanical properties such as tensile properties. That is, it is excellent in heat aging resistance.

The thickness of the covering material of the electric wire of the present invention is preferably 10 to 500 μm, and more preferably 10 to 300 μm.

The covering material may be formed by applying a paint material comprising the composition on the core wire, and firing the paint material, or may be formed by melting extrusion of the composition. The covering material is more preferably formed by melting extrusion of the composition.

When the covering material is formed from a paint material comprising the composition applied on the core wire, and fired, the conditions of the firing may be appropriately set in accordance with the kind of the fluorine-containing polymer (a). For example, the firing is preferably performed at 120 to 260° C.

When the covering material is formed by melting extrusion of the composition, the conditions of the melting extrusion may be appropriately set in accordance with the kind of the fluorine-containing polymer (a). For example, the melting extrusion is preferably performed at 250 to 410° C.

The electric wire of the present invention may be heated after the formation of the covering material. The electric wire may be heated at a temperature in the vicinity of the melting point of the fluororesin.

Examples of the material of the core wire of the electric wire of the present invention used includes, but not particularly limited to, materials of metallic conductors such as copper and silver.

The core wire of the electric wire of the present invention is preferably 50 to 2500 μm in diameter. The covering material of the electric wire is not particularly limited as long as it comprises the composition of the present invention. The fluorine-containing polymer (a) of the composition of the present invention is particularly preferably Et/TFE copolymer. The melting point of the fluorine-containing polymer (a) is also preferably 200 to 250° C.

The electric wire of the present invention may include another layer around the covering material, or the electric wire may include another layer around the core wire and the covering material around another layer.

The another layer may be a resin layer comprising a polyolefin resin such as polyethylene [PE] or a resin such as polyvinyl chloride [PVC] in terms of costs. The thickness of the layer may be, but not particularly limited to, 25 to 500 μm.

Examples of the electric wire of the present invention include cables and wires. More specifically, examples of the electric wire include coaxial cables, cables for high frequency, flat cables, and heat-resistant cables.

The present invention is also a resin formed article formed from the composition. The resin formed article may be formed from the pellet or the masterbatch. Examples of the resin formed article include, but not particularly limited to, films and sheets for solar cells which are used as various covering materials, such as transparent front surface covering materials formed on the light incidence-side surface of a photovoltaic element of a solar cell and back surface covering materials. The resin formed article may be suitable for uses requiring heat resistance. When the composition is used as a material for the resin formed article, the cobalt compound (b) is more preferably at least one cobalt compound selected from the group consisting of tetrapyrrole cyclic compounds and cobalt acetylacetonate in view of excellent thermal stability and heat aging resistance. The cobalt compound (b) is still more preferably an organometallic complex in which a ligand having a porphyrin ring or a phthalocyanine ring makes coordinate bonds with a cobalt atom.

Effect of the Invention

The composition of the present invention has the above-mentioned configuration, and therefore addition of only a small amount of additives imparts excellent heat resistance (suppression of coloring during heating, or improvement in thermal stability and heat aging resistance) to the composition. Therefore, the composition may be suitable for uses requiring heat resistance. The powder coating material of the present invention is formed from the composition, and therefore the coloring of the coating film formed can be suppressed. The pellet of the present invention comprises the composition, and therefore is excellent in heat resistance. The electric wire of the present invention includes the covering material comprising the composition, and therefore is excellent in heat resistance. Even after the electric wire is heated, it is excellent in mechanical properties, such as tensile properties.

MODES FOR CARRYING OUT THE INVENTION

The present invention is more specifically described based on Examples. It is noted that the present invention is not limited to these Examples.

Example 1

A copolymer powder having a melt flow rate of 26 g/10 min at 297° C. and having a molar ratio of ethylene:TFE:(perfluorobutyl)ethylene of 42.6:56.2:1.2 was made into a sheet using a roller compactor, and the sheet was crushed into granular materials, each having a size of about 2 mm. The materials were ground and classified using an atomizer grinding machine. Thus, a copolymer powder having an average particle size of 220 μm and a bulk density of 0.70 g/ml was prepared. Cobalt acetate was added to the copolymer powder, as a cobalt compound, in an amount of 0.001 parts by mass relative to 100 parts by mass of the copolymer powder. The mixture was uniformly dispersed using a Henschel Mixer to prepare a powder coating material. The melt flow rate of the copolymer was the value determined in accordance with ASTM D3159 at a temperature of 297° C. at a load of 5 kgf. The melt flow rates in Examples and Comparative Examples described below were similarly determined.

A heat resistance test was performed as follows. The powder coating material prepared was put on an aluminum plate having a size of 100 mm long by 200 mm wide by 2 mm thick to prepare a powder bed having a size of 50 mm long by 50 mm wide by 5 mm thick using a spacer. The resulting test piece was fired at 300° C. for 2 hours. Thus, the coating film was prepared. Coloring of the coating film was visually observed, and evaluated by the following criterion. Table 1 shows the results.

OO Not colored
O Slightly colored
Δ Colored in yellow ocher
x Colored in brown

Examples 2 to 8 and Comparative Examples 1 to 5

Powder coating materials were prepared by the same procedures as those in Example 1, except that the cobalt compounds shown in Table 1 were used in an amount shown in Table 1 or cobalt (elemental cobalt), copper oxide, copper acetate, or copper benzoate was added instead of the cobalt compound in an amount shown in Table 1. The powder coating materials were evaluated for heat resistance.

Comparative Example 6

A copolymer powder having a melt flow rate of 26 g/10 min at 297° C. and having a molar ratio of ethylene:TFE:(perfluorobutyl)ethylene of 42.6:56.2:1.2 was made into a sheet using a roller compactor, and the sheet was crushed into granular materials, each having a size of about 2 mm. The materials were ground and classified using an atomizer grinding machine. Thus, a powder coating material having an average particle size of 220 μm and a apparent density of 0.70 g/ml was prepared. No cobalt compound was added. Subsequently, the powder coating material was evaluated for heat resistance by the same procedures as those in Example 1.

TABLE 1

|  | Added substance | Amount* | Coloring |
| --- | --- | --- | --- |
| Example 1 | Cobalt acetate | 0.001 | O |
| Example 2 | Cobalt acetate | 0.005 | OO |
| Example 3 | Cobalt benzoate | 0.001 | O |
| Example 4 | Cobalt benzoate | 0.005 | OO |
| Example 5 | Phthalocyanine cobalt | 0.0001 | O |
| Example 6 | Phthalocyanine cobalt | 0.0005 | OO |
| Example 7 | Phthalocyanine cobalt | 0.001 | OO |
| Example 8 | Phthalocyanine cobalt | 0.005 | OO |
| Comparative Example 1 | Cobalt (elemental cobalt) | 0.005 | X |
| Comparative Example 2 | Copper oxide | 0.001 | X |
| Comparative Example 3 | Copper oxide | 0.005 | Δ |
| Comparative Example 4 | Copper acetate | 0.005 | Δ |
| Comparative Example 5 | Copper benzoate | 0.005 | Δ |
| Comparative Example 6 | None | — | X |

*Parts by mass relative to 100 parts by mass of a copolymer comprising ethylene, TFE, and (perfluorobutyl)ethylene Table 1 shows that the coloring of the coating film in accordance with Comparative Example 6 in which no cobalt compound was added was observed. On the other hand, in the coating films in accordance with Examples 1 to 8 in which cobalt acetate, cobalt benzoate, or phthalocyanine cobalt was added as the cobalt compound in an amount of 0.005 parts by mass or less relative to 100 parts by mass of the fluorine-containing polymer, prevention of coloring was observed. Particularly, phthalocyanine cobalt is more effective even if the amount thereof is small. In the coating films in accordance with Comparative Examples 1 to 5 in which cobalt (elemental cobalt), copper oxide, copper acetate, or copper benzoate was used in an amount of 0.005 parts by mass or less relative to 100 parts by mass of the fluorine-containing polymer, sufficient coloring prevention effects were not observed.

Each value in Examples 9 to 18 and Comparative Examples 7 to 11 was determined by the following methods.

[MFR]

Using a melt indexer (product of Toyo Seiki Seisaku-sho, Ltd.), the polymer was allowed to flow out through a nozzle with an inside diameter of 2 mm and a length of 8 mm for 10 minutes at 297° C. at a load of 5 kg according to ASTM D3159. The mass of the polymer was determined as the MFR.

[Copolymer Composition]

The amount of each monomer unit of the copolymer was determined by appropriately combining the techniques of NMR, FT-IR, elemental analysis, and X-ray fluorescence analysis in accordance with the kind of the monomer.

[Melting Point]

The melting point was determined as the temperature corresponding to the maximum value on a heat-of-fusion curve recorded using a DSC apparatus (product of Seiko) at a rate of 10° C./min.

[Thermal Decomposition Temperature]

Using a thermogravimetry-differential thermal analysis apparatus (TG-DTA6200, product of SII NanoTechnology Inc.), a sample was heated at a rate of 10° C./min in air and the variations in weight of the sample was measured. The temperature required for the sample to lose 1% of the mass thereof was determined as the thermal decomposition temperature.

[Heat Aging Test]

The resin composition kneaded was segmented into small pieces. The small pieces were placed into a mold of 120φ, and the mold was mounted on a pressing machine set at 320° C. After 20-minute preheating, compression forming was performed at 4.7 MPaG for 1 minute to produce a 1.5 mm thick sheet. A dumbbell specimen was punched in the resulting sheet in accordance with ASTM D3159, placed in a hot air circulating electric furnace that was heated to 240° C., and allowed to stand for 300 hours. The specimen was then taken out from the furnace and cooled, and subjected to a tensile test at a tensile speed of 50.00 mm/min using a Tensilon universal testing machine (product of ORIENTEC). Average values of tensile strength and tensile elongation at in the case where number is 4 were determined and the remaining ratios were calculated from the values before heat aging.

Synthetic Example 1

A 1000-L autoclave was charged with 416 L of distilled water, the atmosphere in the autoclave was sufficiently replaced with nitrogen gas, and then 287 kg of octafluorocyclobutane was added. Then, the temperature in the system was maintained at 35° C. and the rate of stirring was maintained at 130 rpm. Subsequently, 76.1 kg of tetrafluoroethylene, 2.4 kg of ethylene, 1.47 kg of (perfluorohexyl)ethylene, and 0.63 kg of cyclohexane were added thereto, and thereafter, 3.1 kg of di-n-propylperoxydicarbonate was added. Then, a polymerization reaction was initiated. The pressure in the system may be reduced with the progress of the polymerization. Therefore, mixed gas of tetrafluoroethylene/ethylene=57.0/43.0 mol % was continuously added to thereby maintain the pressure in the system at 1.20 MPaG.

At the same time, 18.2 kg of (perfluorohexyl)ethylene in total was continuously added and the polymerization reaction was continued. After 2.5 hours from the start of the polymerization, 330 g of cyclohexane was added for MFR adjustment. After 17 hours from the start of the polymerization, the pressure in the system was released to atmospheric pressure, and the reaction product was rinsed with water and dried to give 250 kg of a fluororesin powder (fluororesin powder (1)). The rate of the polymerization in the first 2.5 hours of the polymerization was almost uniform, 17.2 kg/hr, and from this point, the rate of the polymerization was 16.0 kg/hr through the completion of the polymerization. The resulting fluororesin powder has a molar ratio of ethylene:tetrafluoroethylene:(perfluorohexyl)ethylene of 42.2:56.4:1.4, a melting point of 252° C., and an MFR of 4.7 (g/10 min).

Synthesis Example 2

A 1000-L autoclave was charged with 312 L of distilled water, the atmosphere in the autoclave was sufficiently replaced with nitrogen gas, and then 212 kg of octafluorocyclobutane was added. Then, the temperature in the system was maintained at 35° C. and the rate of stirring was maintained at 130 rpm. Then, mixed gas of tetrafluoroethylene/ethylene=79/21 mol % was added to increase the pressure in the system to 1.28 MPaG. Further, 1.5 kg of perfluoro(1,1,5-trihydro-1-pentene) and 1.7 kg of cyclohexane were added thereto, and thereafter, 1.1 kg of di-n-propylperoxydicarbonate was added. Then, a polymerization reaction was initiated. The pressure in the system may be reduced with the progress of the polymerization. Therefore, mixed gas of tetrafluoroethylene/ethylene=56.0/44.0 mol % was continuously added to thereby maintain the pressure in the system at 1.28 MPaG. Further, 8.5 kg of perfluoro(1,1,5-trihydro-1-pentene) in total was continuously added, and the polymerization was continued. After 25 hours from the start of the polymerization, the pressure in the system was released to atmospheric pressure, and the reaction product was rinsed with water and dried to give 200 kg of a fluororesin powder (fluororesin powder (2)). The resulting fluororesin powder has a molar ratio of ethylene:tetrafluoroethylene:perfluoro(1,1,5-trihydro-1-pentene) of 43.5:55.0:1.5, a melting point of 264° C., and an MFR of 14.5 (g/10 min).
[Melt Kneading]
The amount of 66 g of a fluororesin including an additive with a predetermined concentration was added to a Labo Plastomill mixer (product of Toyo Seiki Co. Ltd) set at 290° C. The mixture was preliminarily kneaded at 10 rpm for 4 minutes, and then melt-kneaded at 70 rpm for 5 minutes. Thus, a resin composition was prepared.

Example 9

Phthalocyanine cobalt (trade name: Chromofine Blue 5000P, product of Dainichiseika Colour & Chemicals Mfg. Co., Ltd.) was added to the fluororesin powder (1) in an amount of 50 ppm by mass of the total amount of the fluororesin powder (1) and phthalocyanine cobalt (in an amount of 0.0050 parts by mass relative to 100 parts by mass of the fluorine-containing polymer (1)). The fluororesin powder (1) and phthalocyanine cobalt were shook up in a plastic bag. The mixture was melt-kneaded by the above-mentioned procedures to prepare a resin composition. The resin composition was subjected to a heat-aging test by the above-mentioned procedures. Table 2 shows the results.

Example 10

The resin composition was prepared by the same procedures as those in Example 9, except that as an additive to be added to the fluororesin powder (1), [5,10,15,20-tetrakis(4-methoxyphenyl)-21H,23H-porphinato]cobalt (II) (abbreviation: TMP-Co) (trade name: meso-tetramethoxy phenyl porphin cobalt, product of Wako Pure Chemical Industries, Ltd.) was used, and TMP-Co was added in an amount of 50 ppm by mass of the total amount of the fluororesin powder (1) and TMP-Co. Then, the resin composition was subjected to a heat-aging test. Table 2 shows the results.

Example 11

The resin composition was prepared by the same procedures as those in Example 9, except that as an additive to be added to the fluororesin powder (1), TMP-Co was added in an amount of 50 ppm by mass of the total amount of the fluororesin powder (1) and TMP-Co (in an amount of 0.0050 parts by mass relative to 100 parts by mass of the fluorine-containing polymer (1)). Then, the resin composition was subjected to a heat-aging test. Table 2 shows the results.

Example 12

The resin composition was prepared by the same procedures as those in Example 9, except that as an additive to be added to the fluororesin powder (1), TMP-Co was added in an amount of 20 ppm by mass of the total amount of the fluororesin powder (1) and TMP-Co (in an amount of 0.0020 parts by mass relative to 100 parts by mass of the fluorine-containing polymer (1)). Then, the resin composition was subjected to a heat-aging test. Table 2 shows the results.

Comparative Example 7

The fluororesin powder (1) was subjected to a heat-aging test by the above-mentioned procedures. Table 2 shows the results.

TABLE 2

| | Resin | Additive | Concentration of additive | Tensile strength (retention rate/%) | Tensile elongation (retention rate/%) | Thermal decomposition temperature (° C.) |
|---|---|---|---|---|---|---|
| Example 9 | Synthesis Example 1 | Phthalocyanine Co | 50 ppm by mass | 75 | 101 | 398.5 |
| Example 10 | Synthesis Example 1 | TMP-Co | 100 ppm by mass | 72 | 89 | 424.3 |
| Example 11 | Synthesis Example 1 | TMP-Co | 50 ppm by mass | 78 | 102 | 416.2 |
| Example 12 | Synthesis Example 1 | TMP-Co | 20 ppm by mass | 73 | 99 | 401.5 |

TABLE 2-continued

|  | Resin | Additive | Concentration of additive | Tensile strength (retention rate/%) | Tensile elongation (retention rate/%) | Thermal decomposition temperature (° C.) |
|---|---|---|---|---|---|---|
| Comparative Example 7 | Synthesis Example 1 | None | — | 54 | 80 | 366 |

Example 13

The resin composition was prepared by the same procedures as those in Example 9, except that as an additive to be added to the fluororesin powder (1), titanium dioxide (abbreviation: $TiO_2$) (trade name: D-918, product of Sakai Chemical Industry Co., Ltd.) was added in an amount of 1% by mass of the total amount of the fluororesin powder (1) and phthalocyanine cobalt, and phthalocyanine cobalt was added in an amount of 50 ppm by mass of the total amount of the fluororesin powder (1) and phthalocyanine cobalt (in an amount of 0.00500 parts by mass relative to 100 parts by mass of the fluorine-containing polymer (1)). Then, the resin composition was subjected to a heat-aging test. Table 3 shows the results.

Example 14

The resin composition was prepared by the same procedures as those in Example 9, except that as an additive to be added to the fluororesin powder (1), $TiO_2$ was added in an amount of 1% by mass of the total amount of the fluororesin powder (1) and TMP-Co, and TMP-Co was added in an amount of 50 ppm by mass of the total amount of the fluororesin powder (1) and TMP-Co (in an amount of 0.0050 parts by mass relative to 100 parts by mass of the fluorine-containing polymer (1)). Then, the resin composition was subjected to a heat-aging test. Table 3 shows the results.

Comparative Example 8

The resin composition was prepared by the same procedures as those in Example 9, except that as an additive to be added to the fluororesin powder (1), $TiO_2$ was added in an amount of 1% by mass of the total amount of the fluororesin powder (1) and $TiO_2$, and no phthalocyanine cobalt was added. Then, the resin composition was subjected to a heat-aging test. Table 3 shows the results.

Example 15

The resin composition was prepared as follows: TMP-Co was added to the fluororesin powder (2) in an amount of 50 ppm by mass of the total amount of the fluororesin powder (2) and TMP-Co (in an amount of 0.0050 parts by mass relative to 100 parts by mass of the fluorine-containing polymer (2)). The mixture was melt-kneaded by the same procedures as those in Example 9. The thermal decomposition temperature of the resin composition was measured by the above-mentioned procedures. Table 4 shows the results.

Example 16

The resin composition was prepared as follows: TMP-Co was added to FEP (trade name: Neoflon FEP NP101, product of DAIKIN INDUSTRIES, Ltd.) in an amount of 50 ppm by mass of the total amount of FEP and TMP-Co (in an amount of 0.0050 parts by mass relative to 100 parts by mass of FEP). The mixture was melt-kneaded by the same procedures as those in Example 9. The thermal decomposition temperature of the resin composition was measured by the above-mentioned procedures. Table 4 shows the results.

Example 17

The resin composition was prepared as follows: TMP-Co was added to PVdF (trade name: Neoflon PVDF VP825, product of DAIKIN INDUSTRIES, Ltd.) in an amount of 50 ppm by mass of the total amount of PVdF and TMP-Co (in an amount of 0.0050 parts by mass relative to 100 parts by mass of PVdF). The mixture was melt-kneaded at 210° C. using a laboratory mill. The thermal decomposition temperature of the resin composition was measured by the same procedures as those in Example 13. Table 4 shows the results.

Comparative Example 9

The thermal decomposition temperature of the fluororesin powder (2) was measured by the above-mentioned procedures. Table 4 shows the results.

Comparative Example 10

The thermal decomposition temperature of the FEP (trade name: Neoflon FEP NP101, product of DAIKIN INDUSTRIES, Ltd.) was measured by the above-mentioned procedures. Table 4 shows the results.

TABLE 3

|  | Original resin | Additive | Concentration of additive | Tensile strength (retention rate/%) | Tensile elongation (retention rate/%) | Thermal decomposition temperature (° C.) |
|---|---|---|---|---|---|---|
| Example 13 | Synthesis Example 1 | $TiO_2$ Phthalocyanine Co | 1% by mass 50 ppm by mass | 65 | 78 | 371.7 |
| Example 14 | Synthesis Example 1 | $TiO_2$ TMP-Co | 1% by mass 50 ppm by mass | 82 | 106 | 388.4 |
| Comparative Example 8 | Synthesis Example 1 | $TiO_2$ | 1% by mass | 58 | 66 | 366.4 |

Comparative Example 11

The thermal decomposition temperature of the PVdF (trade name: Neoflon PVDF VP825, product of DAIKIN INDUSTRIES, Ltd.) was measured by the above-mentioned procedures. Table 4 shows the results.

TABLE 4

|  | Original resin | Additive | Concentration of additive | Thermal decomposition temperature/ °C. |
|---|---|---|---|---|
| Example 15 | Synthesis Example 2 | TMP-Co | 50 ppm by mass | 402.5 |
| Example 16 | FEP | TMP-Co | 50 ppm by mass | 410.7 |
| Example 17 | PVdF | TMP-Co | 50 ppm by mass | 398.2 |
| Comparative Example 9 | Synthesis Example 2 | None | — | 352.6 |
| Comparative Example 10 | FEP | None | — | 402.6 |
| Comparative Example 11 | PVdF | None | — | 375.6 |

Example 18

Cobalt(II) acetylacetonate dihydrate (product of Wako Pure Chemical Industries, Ltd.) was added to the fluororesin powder (1) in an amount of 50 ppm by mass of the total amount of the fluororesin powder (1) and cobalt(II) acetylacetonate dihydrate (in an amount of 0.0050 parts by mass relative to 100 parts by mass of the fluororesin powder (1)). The fluororesin powder (1) and cobalt(II) acetylacetonate dihydrate were shook up in a plastic bag. The mixture was melt-kneaded by the above-mentioned procedures to prepare a resin composition. The resin composition was subjected to a heat-aging test by the above-mentioned procedures. Table 5 shows the results of Example 18 and Comparative Example 7.

TABLE 5

|  | Resin | Additive | Concentration of additive | Tensile strength (Retention rate/%) | Tensile elongation (Retention rate/%) | Thermal decomposition temperature (° C.) |
|---|---|---|---|---|---|---|
| Example 18 | Synthesis Example 1 | Cocobalt acetylacetonate dihydrate | 50 ppm by mass | 78 | 102 | 406.6 |
| Comparative Example 7 | Synthesis Example 1 | None | — | 54 | 80 | 366 |

INDUSTRIAL APPLICABILITY

The composition of the present invention can be used for various uses requiring heat resistance. Specifically, the composition is particularly useful as a powder coating material used in a corrosion resistant lining used for covering materials of electric wires, chemical and medical instruments, and semiconductor manufacturing facilities.

The present application claims priority to Patent Application No. 2009-156023 filed in Japan on Jun. 30, 2009 and Patent Application No. 2010-084072 filed in Japan on Mar. 31, 2010 under the Paris Convention and provisions of national law in a designated State, the entire contents of which are hereby incorporated by reference.

The invention claimed is:

1. A composition, comprising: a fluorine-containing polymer (a) and a cobalt compound (b),
    wherein the fluorine-containing polymer (a) includes a polymerization unit based on at least one monomer selected from the group consisting of tetrafluoroethylene, hexafluoropropylene, perfluoro(alkyl vinyl ether), chlorotrifluoroethylene, vinylidene fluoride, and vinyl fluoride,
    wherein the cobalt compound (b) is at least one selected from the group consisting of cobalt acetate, cobalt benzoate, and organometallic complexes of cobalt, and
    wherein an amount of the cobalt compound (b) is 1 to 100 ppm of the fluorine-containing polymer (a).

2. The composition according to claim 1,
    wherein the cobalt compound (b) is a tetrapyrrole cyclic compound.

3. The composition according to claim 1,
    wherein the cobalt compound (b) is an organometallic complex in which a ligand having a porphyrin ring or a phthalocyanine ring makes coordinate bonds with a cobalt atom.

4. The composition according to claim 1,
    wherein the cobalt compound (b) is phthalocyanine cobalt.

5. The composition according to claim 1,
    wherein the cobalt compound (b) is cobalt acetylacetonate.

6. The composition according to claim 1,
    wherein an amount of the cobalt compound (b) is 1 to 50 ppm of the fluorine-containing polymer (a).

7. The composition according to claim 1,
    wherein the fluorine-containing polymer (a) is at least one selected from the group consisting of polytetrafluoroethylene, tetrafluoroethylene/hexafluoropropylene copolymer, tetrafluoroethylene/perfluoro(alkyl vinyl ether) copolymers, ethylene/tetrafluoroethylene copolymer, ethylene/tetrafluoroethylene/hexafluoropropylene copolymer, polychlorotrifluoroethylene, chlorotrifluoroethylene/tetrafluoroethylene copolymer, ethylene/chlorotrifluoroethylene copolymer, polyvinylidene fluoride, tetrafluoroethylene/vinylidene fluoride copolymer, vinylidene fluoride/hexafluoropropylene/tetrafluoroethylene copolymer, vinylidene fluoride/hexafluoropropylene copolymer, and polyvinyl fluoride.

8. The composition according to claim 1,
    wherein the fluorine-containing polymer (a) is at least one selected from the group consisting of ethylene/tetrafluoroethylene copolymer and ethylene/tetrafluoroethylene/hexafluoropropylene copolymer.

9. The composition according to claim 1, further comprising a titanium oxide.

10. A powder coating material, comprising the composition according to claim 1.

11. A pellet, comprising the composition according to claim 1.

12. A resin formed article formed from the composition according to claim 1.

13. An electric wire, comprising:
    a core wire; and
    a covering material made of the composition according to claim 1, covering the core wire.

14. A method for producing the composition according to claim 1, the method comprising:

preparing a masterbatch for resin forming including the fluorine-containing polymer (a), and the cobalt compound (b) in an amount of 0.1% by mass or more of the amount of the fluorine-containing polymer (a) by mixing the fluorine-containing polymer (a) and the cobalt compound (b), preparing the composition according to claim 1 by adding the fluorine-containing polymer (a) to the masterbatch for resin forming.

\* \* \* \* \*